(12) United States Patent
Watts

(10) Patent No.: US 6,889,295 B2
(45) Date of Patent: May 3, 2005

(54) RE-ORDERING REQUESTS FOR SHARED RESOURCES

(75) Inventor: Jonathan Manuel Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 10/091,760

(22) Filed: Mar. 5, 2002

(65) Prior Publication Data

US 2003/0172237 A1 Sep. 11, 2003

(51) Int. Cl.[7] .................. G06F 12/08; G06F 13/366
(52) U.S. Cl. ................. 711/151; 711/150; 711/158; 711/169
(58) Field of Search ................... 711/147, 150, 711/151, 154, 158, 167, 169

(56) References Cited

U.S. PATENT DOCUMENTS

| | | | |
|---|---|---|---|
| 5,822,772 A | * | 10/1998 | Chan et al. .................. 711/158 |
| 5,950,226 A | * | 9/1999 | Hagersten et al. ........... 711/124 |
| 6,219,769 B1 | | 4/2001 | Strongin et al. |
| 6,275,914 B1 | | 8/2001 | Jeddeloh |
| 6,321,309 B1 | | 11/2001 | Bell et al. |
| 6,330,632 B1 | | 12/2001 | Watts |
| 6,338,125 B1 | | 1/2002 | Kopser et al. |

OTHER PUBLICATIONS

Microsoft Computer Dictionary, Copyright 1999, Microsoft Press, Fourth Edition, p. 435.*

* cited by examiner

*Primary Examiner*—Mano Padmanabhan
*Assistant Examiner*—Midys Inoa

(57) ABSTRACT

In accordance with one embodiment, a method re-orders requests for shared resources. The method includes receiving requests for accessing the shared resources from one or more requestors, wherein a plurality of requests may be received from each requestor; arbitrating between the plurality of requests in such a way so that the plurality of requests from each requestor may be re-ordered in non-FIFO order; and selecting a next request to access the shared resources based on the re-ordering of requests. In accordance with another embodiment, a system re-orders requests for shared resources. The system includes one or more requestors for sending requests for accessing the shared resources, wherein a plurality of requests may be received from each requestor; and an arbiter for arbitrating between the plurality of requests in such a way so that the plurality of requests from each requestor may be re-ordered in non-FIFO order.

24 Claims, 6 Drawing Sheets

RE-ORDERING REQUESTS FOR SHARED RESOURCES

BACKGROUND OF THE INVENTION

1. Field of the Invention

The present invention relates generally to communications networks and electronic systems. More particularly, the invention relates to accessing shared resources.

2. Description of the Background Art

Arbitration for access by multiple requestors to shared resources is usually performed by an arbitration mechanism with a round robin or priority encoder algorithm. In a typical round robin or priority encoder based arbitration scheme, the choice of which requester is granted access next is made without knowledge of which resource is being accessed.

U.S. Pat. No. 6,330,632 (the Watts patent) relates to a system for arbitrating access from multiple requestors to shared resources over a shared communications link. The disclosure of the Watts patent is hereby incorporated by reference into this application. FIG. 1 is a diagram depicting the system disclosed in the Watts patent and is described as follows as background to the present invention.

FIG. 1 is a block schematic diagram showing a system 10 in which an arbitration mechanism is provided to arbitrate for access to a group of shared resources S1, S2, S3, and SN that are communicating with multiple requesters R1, R2, R3, and RN over a shared communications link 12. Information is maintained about the state of the shared resources. This allows the provision of an arbitration algorithm 10 that uses the shared communications link more efficiently.

FIG. 2 is a flow chart depicting a conventional process 200 of accessing a group of shared resources that includes a capability for arbitration between requestors. The process 200 as depicted includes three steps (202, 204, and 206).

In the first step 202, multiple (one or more) requestors send requests for accessing the shared resources to an arbitration mechanism (an arbiter). The requestors, the shared resources, and the arbiter may be configured to intercommunicate, for example, as shown in FIG. 1.

In the second step 204, the arbiter arbitrates for access to the shared resources. In doing so, the arbiter prioritizes between the requestors. Various arbitration algorithms may be used to determine such prioritization. As a result of this step, the arbiter selects the next requestor to access the shared resources.

Finally, in the third step 206, the longest pending (first in) request from the selected requestor is serviced. In this manner, requests from a same requestor are fulfilled in first-in-first-out (FIFO) order.

Disadvantageously, while the conventional process 200 described in relation to FIG. 2 may prioritize between requestors, it services requests from a same requestor in FIFO order. This limits the efficiency of the conventional process 200.

An alternate conventional process may use multiple request interfaces to differentiate between multiple types of requests from a single requester. However, multiple request interfaces introduce substantial additional complexity to a system and requests of a same type from a single requestor are still typically serviced in FIFO order.

Despite the accomplishments of previous systems for accessing shared resources, further improvements may be made to such systems.

BRIEF DESCRIPTION OF THE DRAWINGS

Non-limiting and non-exhaustive embodiments of the present invention are described in the Figures, in which.

SUMMARY

In accordance with one embodiment of the invention, a method re-orders requests for shared resources. The method includes receiving requests for accessing the shared resources from one or more requestors, wherein a plurality of requests may be received from each requestor; arbitrating between the plurality of requests in such a way so that the plurality of requests from each requester may be re-ordered in non-FIFO order; and selecting a next request to access the shared resources based on the re-ordering of requests.

In accordance with another embodiment of the invention, a system re-orders requests for shared resources. The system includes one or more requestors for sending requests to access the shared resources, wherein a plurality of requests may be received from each requestor; and an arbiter for arbitrating between the plurality of requests in such a way so that the plurality of requests from each requestor may be re-ordered in non-FIFO order.

DETAILED DESCRIPTION

What is needed is further improvement to systems that arbitrate access to shared resources.

The present invention relates to a system and process that enables re-ordering of multiple requests from a single requestor so that the requests may be serviced in non-FIFO order. This may be accomplished by the utilization of request tagging, as described further below. Complex multiple request interfaces are not needed. This technique advantageously provides flexibility in allowing re-ordering requests to achieve greater efficiency in accessing the shared resources. The flexibility is provided while avoiding the addition of substantial complexity to the system.

Figure 1:
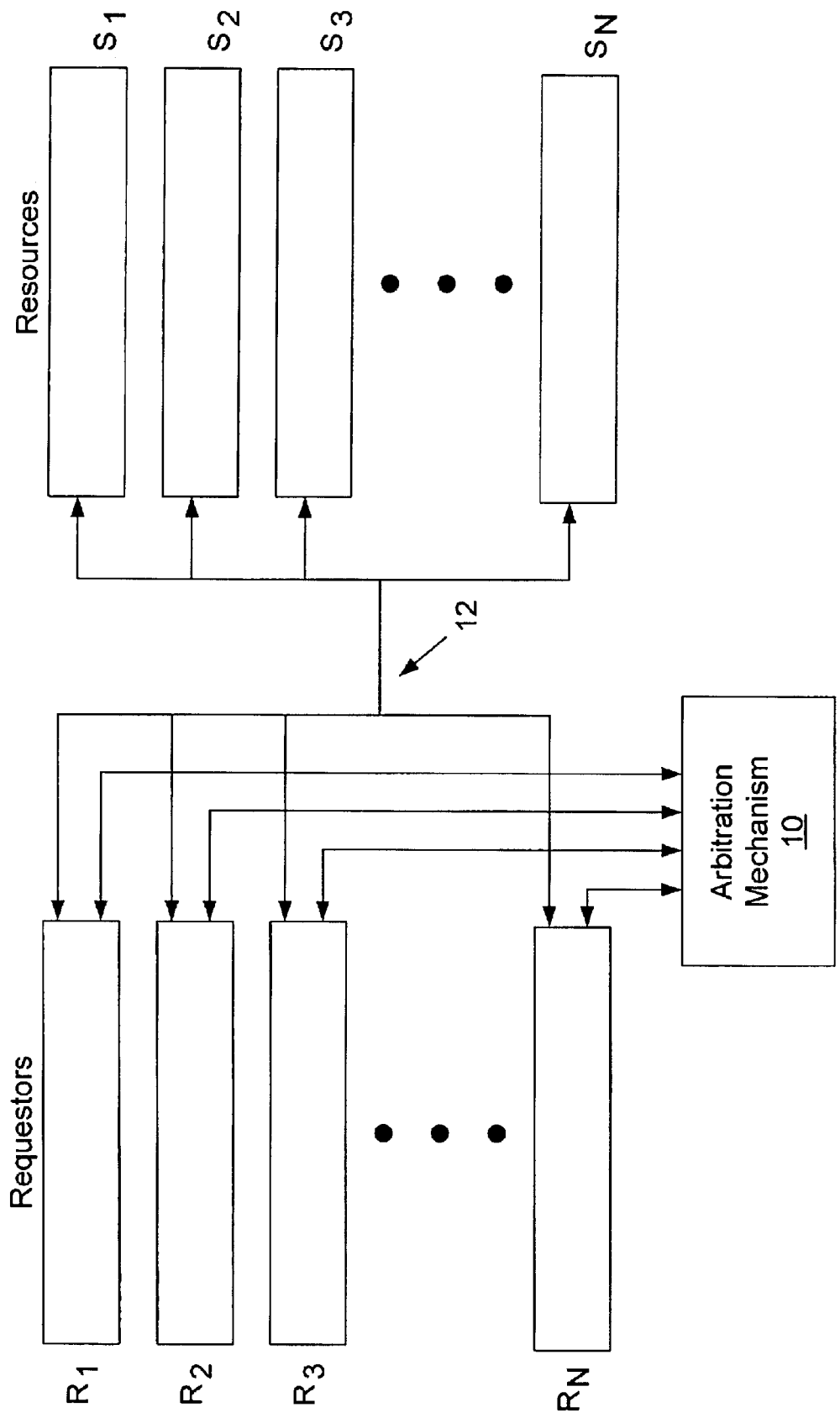
FIG. 1 is a block schematic diagram from the Watts patent showing a system in which an arbitration mechanism is provided to arbitrate for access to a group of shared resources S1, S2, S3, and SN that are communicating with multiple requesters R1, R2, R3, and RN over a shared communications link.
Figure 2:
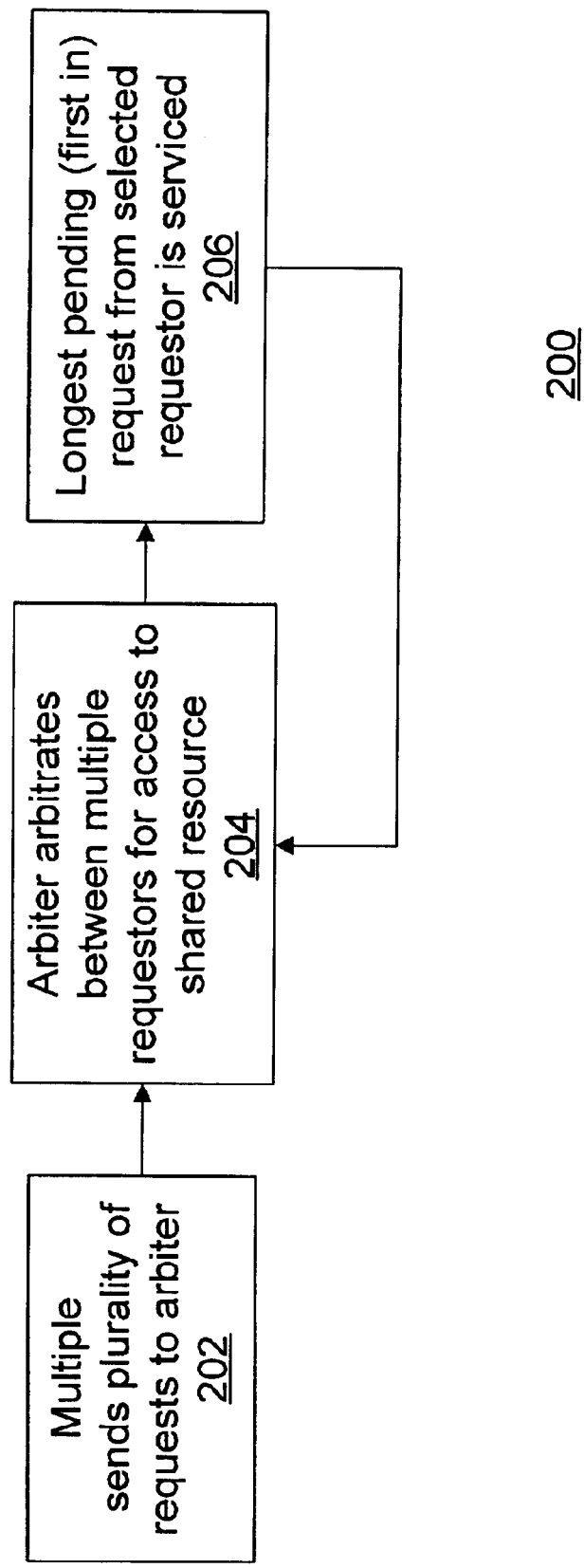
FIG. 2 is a flow chart depicting a conventional process of accessing a group of shared resources that includes a capability for arbitration between requestors.
Figure 3:
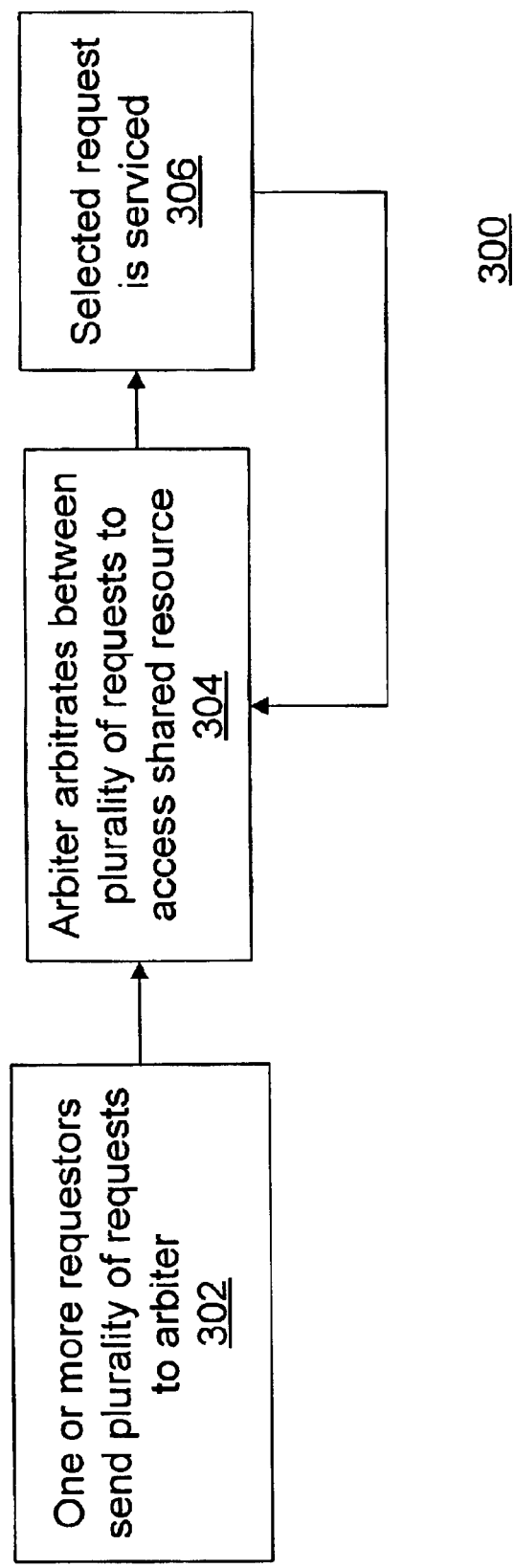
FIG. 3 is a basic flow chart providing an overview of a process 300 which re-orders requests in accordance with an embodiment of the present invention.

FIG. 3 is a basic flow chart providing an overview of a process 300 which re-orders requests in accordance with an embodiment of the present invention. The process 300 as depicted includes three step (302, 304, and 306). The process 300 advantageously provides for greater efficiency while avoiding the addition of substantial complexity.

In the first step(s) 302, one or more requestors send a plurality of requests to access shared resources to an arbitration mechanism (arbiter). Each requestor may itself send a plurality of requests. For example, in a preferred embodiment, the requests may be memory requests (for example, to a Direct Rambus DRAM). In alternate embodiments, the requests may be non-memory requests.

In the second step 304, the arbiter arbitrates between the plurality of requests. In doing so, the arbiter does not merely prioritize between the requestors; it prioritizes between the requests themselves, even between multiple requests received from a single requester. Such re-ordering of requests from a single requester would normally confuse the requestor, as the requester would not be able to rely on the FIFO order of requests being serviced. However, the request tagging of the present invention, as described further below in relation to FIGS. 4, 5A and 5B, may be used to keep the requestor informed as to the order in which its requests are being serviced. As a result of this step, the arbiter selects a next request to access the shared resource. The selected request depends upon the outcome of the arbitration between the plurality of requests. Unlike the conventional process 200 where the arbiter chooses the next requestor, the arbiter here chooses the next request.

In the third step 306, the selected request is serviced. This is accomplished by giving access to the shared resource so that the request may be fulfilled. Unlike the conventional process 200 where the requests from each requestor are serviced in FIFO order, here the requests from a particular requestor may be serviced in non-FIFO order. They may be serviced in FIFO order, but they don't have to be.

Figure 4:
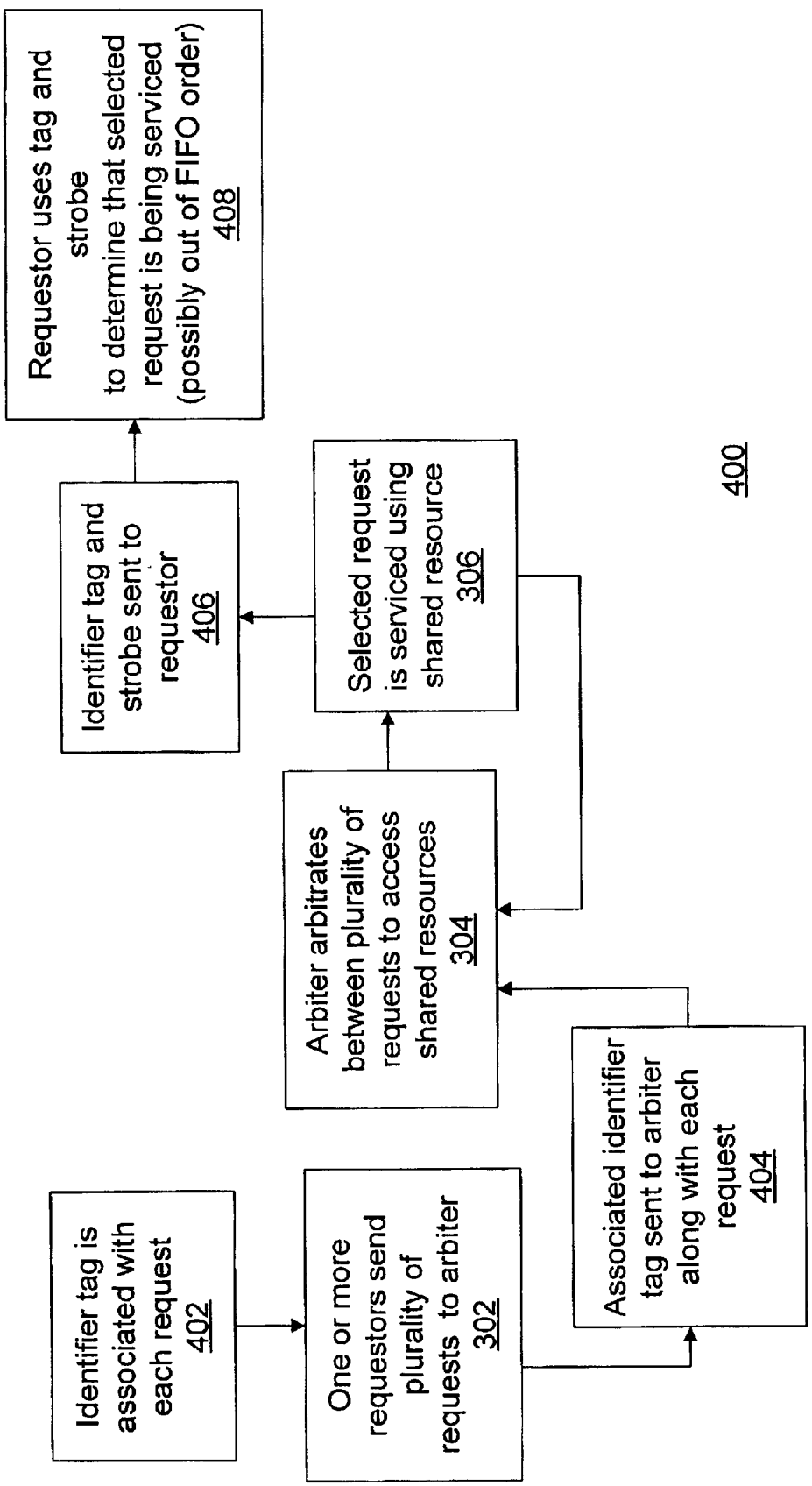
FIG. 4 is a more detailed flow chart that shows the use of request tags to enable the re-ordering of requests in accordance with an embodiment of the present invention.

FIG. 4 is a more detailed flow chart that shows the use of request tags to enable the re-ordering of requests in accordance with an embodiment of the present invention. The process 400 depicted in FIG. 4 shows four implementation steps (402, 404, 406, and 408) in addition to the steps in FIG. 3.

In the first implementation step 402, an identifier tag (request tag) is associated with each request. The assignment of request tags may be done by the requester. In one embodiment, the request tags may comprise n-bit tags (for example, 4-bit, 8-bit or 16-bit tags). An n-bit tag may allow for up to $2^n$ different requests to be identified and tracked at the same time. In addition to the bits used to differentiate between the requests, additional bits may be included in the tag to allow additional information to be embedded into the tag. For example, additional bits may be used to identify a location in a buffer memory address space that holds data relating to the request.

Next, in accordance with the first step 302 of FIG. 3, one or more requestors send a plurality of requests to access shared resources to an arbitration mechanism (arbiter). Each requestor may itself send a plurality of requests. For example, in a preferred embodiment, the requests may be memory requests (for example, to a Direct Rambus DRAM). In alternate embodiments, the requests may be non-memory requests.

The second implementation step 404 follows that step 302. In accordance with the second implementation step 404, the associated request tag is sent to the arbiter with each request. This provides a labeling mechanism that the arbiter and requestor may use to track the servicing of each request.

Next follows the second and third steps (304 and 306) of FIG. 3. In accordance with the second step 304 of FIG. 3, the arbiter arbitrates between the plurality of requests. In doing so, the arbiter does not merely prioritize between the requestors; it prioritizes between the requests themselves, even between multiple requests received from a single requester. Such re-ordering of requests from a single requestor would normally confuse the requestor, as the requestor would not be able to rely on the FIFO order of requests being serviced. As a result of this step, the arbiter selects a next request to access the shared resource. The selected request depends upon the outcome of the arbitration between the plurality of requests. Unlike the conventional process 200 where the arbiter chooses the next requestor, the arbiter here chooses the next request.

Then, in accordance with the third step 306 of FIG. 3, the selected request is serviced. This is accomplished by giving access to the shared resource so that the request may be fulfilled. Unlike the conventional process 200 where the requests from each requestor are serviced in FIFO order, here the requests from a particular requester may be serviced in non-FIFO order. They may be serviced in FIFO order, but they don't have to be.

After (or prior to or in parallel with) the third step 306 of FIG. 3, the third implementation step 406 is performed. In the third implementation step 406, the request tag and a strobe signal are sent to the requestor from the arbiter. The corresponding request tag is, of course, the identifier tag for the selected request being serviced. The strobe signal may comprise, for example, a one-bit acknowledgement message indicating that the selected request is being serviced. For example, an acknowledgement bit set at "1" may indicate that the selected request is being serviced (while an acknowledgement bit set at "0" may indicate that the selected request is not being serviced).

Finally, the fourth implementation step 408 follows the third implementation step 406. In the fourth implementation step 408, the requestor receives the tag and strobe and may use them to determine that the identified request is being serviced (possibly out of FIFO order).

In one embodiment, additional information (beyond identification information) embedded in the tag may be used by the intermediate system to locate or place data associated with the request. For example, for a memory write request, the additional information may be the location in a buffer of the data to be written into the memory. As another example, for a memory read request, the additional information may be the destination in the buffer for the data read from the memory.

In another embodiment, a confirmation message may be sent to the requestor after fulfillment of the selected request. The confirmation message may, naturally, use the request tag to identify the particular request fulfilled. For certain requests, such as memory read requests, data would be returned to the requestor in fulfilling the request.

Figure 5A:
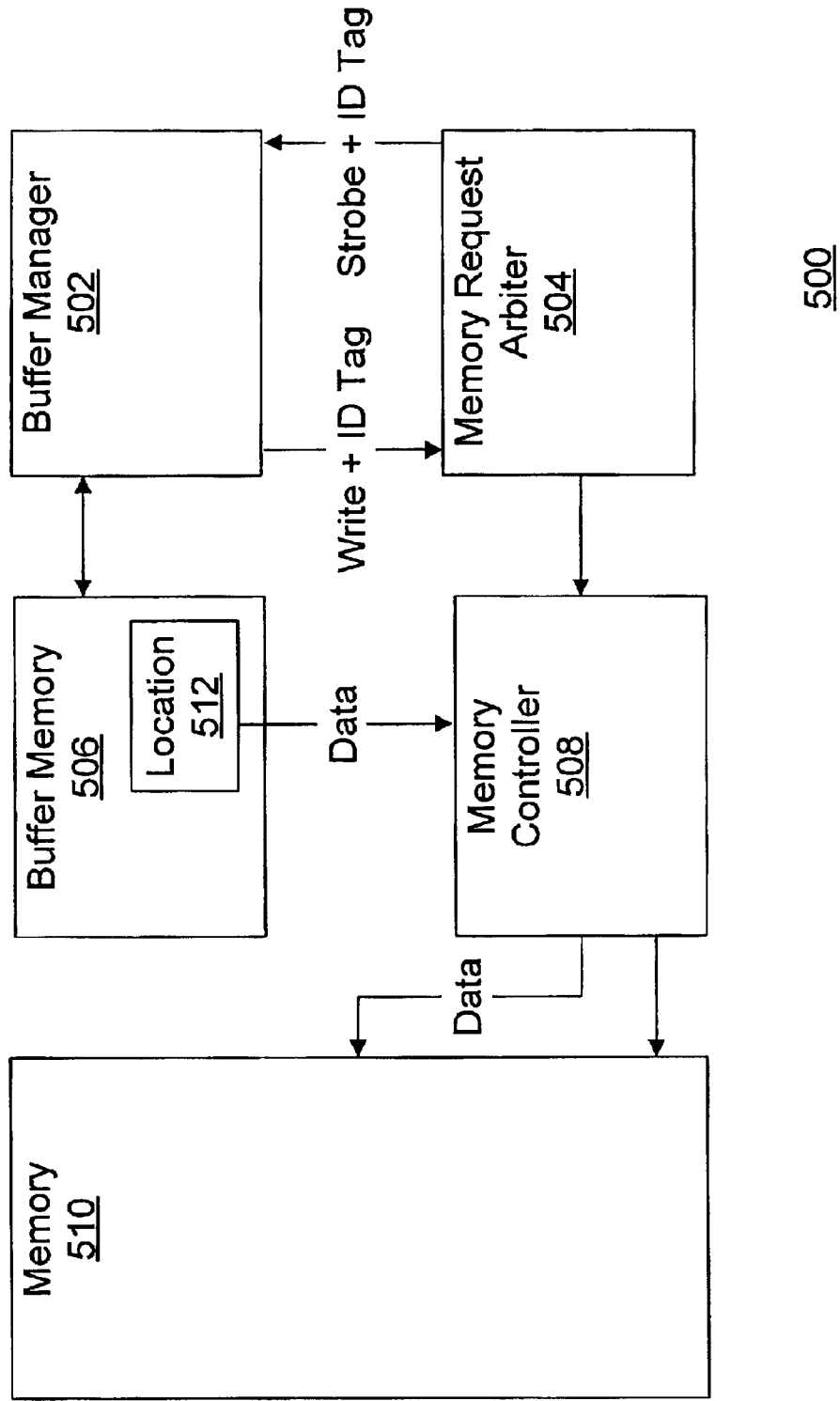
FIG. 5A is a schematic diagram depicting a system that uses request tagging in selecting and servicing a memory write in non-FIFO order in accordance with an embodiment of the present invention.

FIG. 5A is a schematic diagram depicting a system 500 using request tagging in selecting and servicing a memory write in non-FIFO order in accordance with an embodiment of the present invention. The system 500 shown may, for example, be part of a wiring-closet-level Ethernet switching system. The system 500 may include a buffer manager 502, a memory request arbiter 504, a buffer memory 506, a memory controller 508, and a memory 510.

The buffer manager 502 may receive various requests from originating devices (originators) for access to the memory 510. The buffer manager 502 may assign identifier tags (request tags) to these memory requests. As described above, in one embodiment, the request tags may comprise n-bit tags (for example, 4-bit, 8-bit or 16-bit tags). In addition to the bits used to differentiate between the requests, additional bits may be included in the tag to allow additional information to be embedded into the tag.

In the particular example discussed in conjunction with FIG. 5A, the buffer manager 502 may receive a particular write request from an originator. The buffer manager 502 then associates a unique request tag to the write request and forwards the write request and associated tag to the arbiter 504. In one embodiment, additional embedded information may be embedded in the tag relating to the location in the buffer memory 506 of the data to be written.

The memory request arbiter 504 receives the write request and associated request tag. The arbiter 504 proceeds to arbitrate between various requests vying for access to the memory 510. Eventually, the arbiter 504 selects the particular write request of this example. When the write request is selected, the arbiter 504 may return the associated request tag and a strobe to the buffer manager 502 (the requestor). As described above, the strobe may comprise a signal (for example, a bit line) that provides an acknowledgment that the particular request is next to be serviced.

The arbiter 504 also communicates information needed to perform the write operation (address and length in memory 510) to the memory controller 508. In addition, the location 512 within the buffer memory 506 of the data to be written is communicated. This location may be extracted from additional information (not needed to identify the request) that is embedded in the tag. The memory controller 508 then goes on to service the write request by writing the data to the memory 510. In doing so, the memory controller 508 may use the location information to select the appropriate data and transfer it from the buffer memory 506.

Figure 5B:
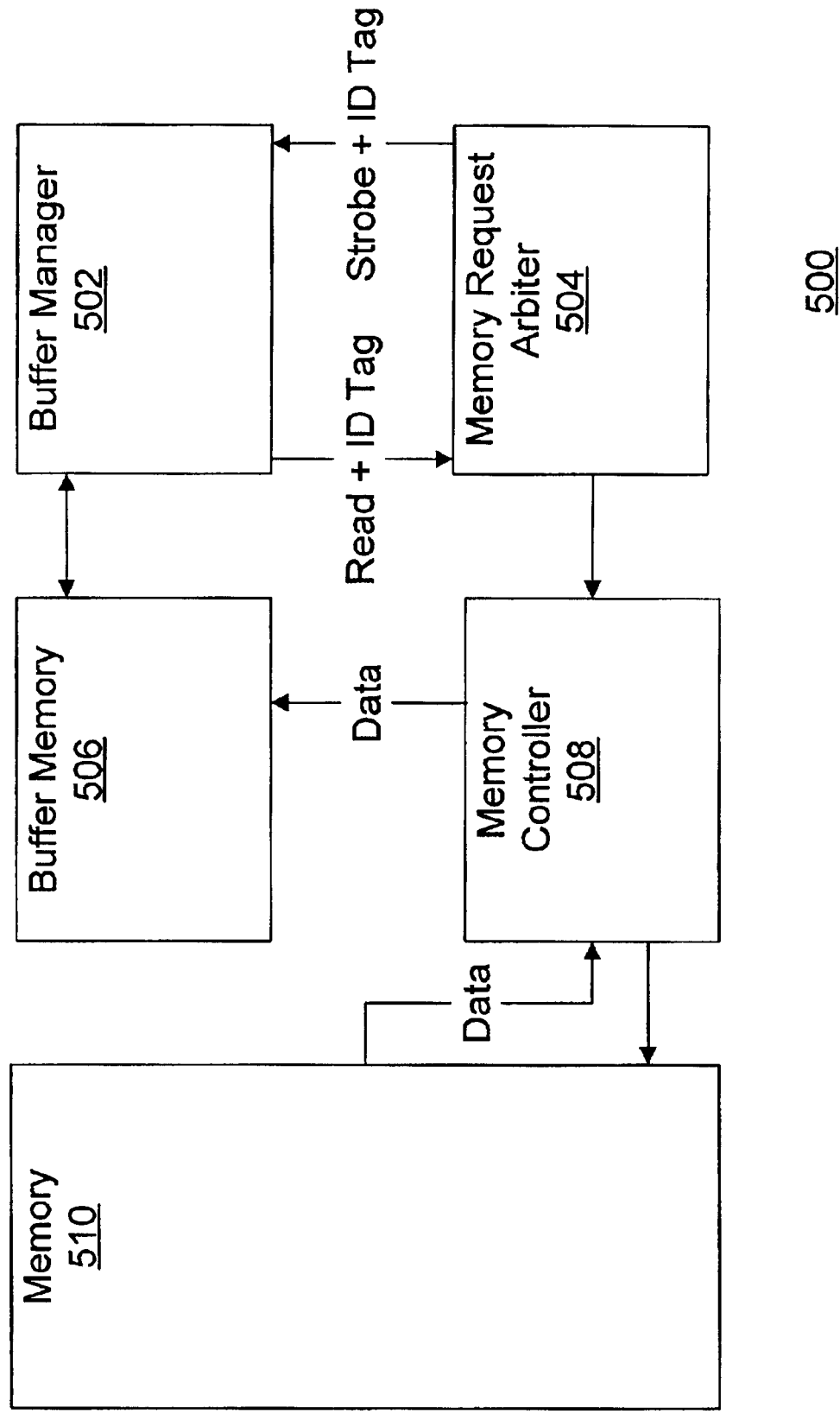
FIG. 5B is a schematic diagram depicting a system that uses request tagging in selecting and servicing a memory read in non-FIFO order in accordance with an embodiment of the present invention.

FIG. 5B is a schematic diagram depicting a system 500 using request tagging in selecting and servicing a memory read in non-FIFO order in accordance with an embodiment of the present invention. The system 500 in FIG. 5A and the system 500 in FIG. 5B may, of course, be the same system with FIG. 5 illustrating the memory write and FIG. 5B illustrating the memory read.

In this case, the buffer manager 502 may receive a particular read request from an originator. The buffer manager 502 then associates a unique request tag to the read request and forwards the write request and associated tag to the arbiter 504. In one embodiment, additional embedded information may be embedded in the tag relating to the location in the buffer memory 506 where the data that is read is to be placed (for subsequent transfer to the originator of the read request).

The memory request arbiter 504 receives the read request and associated request tag. The arbiter 504 proceeds to arbitrate between various requests vying for access to the memory 510. Eventually, the arbiter 504 selects the particular read request of this example. When the read request is selected, the arbiter 504 may return the associated request tag and a strobe to the buffer manager 502 (the requestor). As described above, the strobe may comprise a signal (for example, a bit line) that provides an acknowledgment that the particular request is next to be serviced.

The arbiter 504 also communicates information needed to perform the read operation (address and length in memory 510) to the memory controller 508. The memory controller 508 then goes on to service the read request by reading the data from the memory 510.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for re-ordering requests for shared resources, the method comprising:

receiving, by an arbiter, requests for accessing the shared resources from one or more requestors, wherein a plurality of requests may be received from each requestor;

associating, by a buffer manager, a unique identifier tag with each request from the one or more requestors;

arbitrating, by the arbiter, between the plurality of requests in such a way so that the plurality of requests from each requestor may be re-ordered in non-FIFO order;

selecting, by the arbiter, a next request to access the shared resources based on the re-ordering of requests;

sending, by the arbiter to the requestor, a unique identifier tag associated with the selected request and a strobe signal indicating that the selected request is being serviced by a memory controller, so that the requestor is informed as to the order in which the request from the requestor is being serviced; and communicating an information from the arbiter to the memory controller, where the memory controller accesses the shared resources and the information permits the memory controller to service the request selected by the arbiter.

2. The method of claim 1, further comprising:

using the identifier tag by the requestors to keep track of when the plurality of requests from each requestor are serviced.

3. The method of claim 1, further comprising:

embedding additional information in the identifier tag that relates to data associated with the request.

4. The method of claim 3, wherein the selected request comprises a memory write request.

5. The method of claim 4, wherein the additional information in the identifier tag associated with the memory write request includes a location in buffer memory of data to be written.

6. The method of claim 3, wherein the selected request comprises a memory read request.

7. The method of claim 6, wherein the additional information in the identifier tag associated with the memory read request includes a location in buffer memory in which the data is to be written.

8. The method of claim 1, wherein the requests comprise memory requests, and wherein the shared resources comprise a shared memory system.

9. A system for re-ordering requests for shared resources, the system comprising:

one or more requestors for sending requests for accessing the shared resources, wherein a plurality of requests may be received from each requestor;

a buffer manager for associating a unique identifier tag with each request from the one or more requestors;

an arbiter for receiving the plurality of request and for arbitrating between the plurality of requests in such a way so that the plurality of requests from each requestor may be re-ordered in non-FIFO order, and for selecting a next request to access the shared resources based on the re-ordering of requests;

the arbiter also configured to send to the requestor a unique identifier tag associated with the selected request and a strobe signal indicating that the selected request is being serviced by a memory controller, so that the requestor is informed as to the order in which the request from the requestor is being serviced; and a memory controller configured to access the shared resources, wherein the arbiter communicates an information to the memory controller and wherein the information permits the memory controller to service the request selected by the arbiter based on a re-ordering of the requests.

10. The system of claim 9, wherein the requestors use identifier tags to keep track of when the plurality of requests from each requestor are serviced.

11. The system of claim 9, wherein the identifier tag includes additional information that relates to data associated with the selected request.

12. The system of claim 11, wherein the selected request comprises a memory write request.

13. The system of claim 12, wherein the additional information in the identifier tag associated with the memory write request includes a location in buffer memory of data to be written.

14. The system of claim 11, wherein the selected request comprises a memory read request.

15. The system of claim 14, wherein the additional information in the identifier tag associated with the memory read request includes a location in buffer memory in which the data is to be written.

16. The system of claim 9, wherein the requests comprise memory requests, and wherein the shared resources comprise a shared memory system.

17. An apparatus for re-ordering requests for shared resources, the apparatus comprising:

means for receiving, by an arbiter, requests for accessing the shared resources from one or more requestors, wherein a plurality of requests may be received from each requestor;

means for associating, by a buffer manager, a unique identifier tag with each request from the one or more requestors;

means for arbitrating, by the arbiter, between the plurality of requests in such a way so that the plurality of requests from each requestor may be re-ordered in non-FIFO order;

means for selecting, by the arbiter, a next request to access the shared resources based on the re-ordering of requests;

means for sending, by the arbiter to the requestor, a unique identifier tag associated with the selected request and a strobe signal indicating that the selected request is being serviced by a memory controller, so that the requestor is informed as to the order in which the request from the requestor is being serviced; and means for communicating an information from the arbiter to the memory controller, where the memory controller accesses the shared resources and the information permits the memory controller to service the next request selected by the arbiter.

18. The apparatus of claim 17, further comprising:

means for using the identifier tag by the requestors to keep track of when the plurality of requests from each requestor are serviced.

19. The apparatus of claim 17, further comprising:

means for embedding additional information in the identifier tag that relates to data associated with the request.

20. The apparatus of claim 19, wherein the selected request comprises a memory write request.

21. The apparatus of claim 20, wherein the additional information in the identifier tag associated with the memory write request includes a location in buffer memory of data to be written.

22. The apparatus of claim 19, wherein the selected request comprises a memory read request.

23. The apparatus of claim 22, wherein the additional information in the identifier tag associated with the memory read request includes a location in buffer memory in which the data is to be written.

24. The apparatus of claim 17, wherein the requests comprise memory requests, and wherein the shared resources comprise a shared memory system.

\* \* \* \* \*